UNITED STATES PATENT OFFICE.

JOSEPH WOLFF, OF CINCINNATI, OHIO.

IMPROVEMENT IN THE MANUFACTURE OF YEAST FOR DISTILLERS.

*Specification forming part of Letters Patent No.* 99,615, *dated February* 8, 1870; *reissue No.* 3,959, *dated May* 3, 1870.

*To all whom it may concern:*

Be it known that I, JOSEPH WOLFF, of Cincinnati, in the county of Hamilton and State of Ohio, have invented a new and useful Improvement in the Manufacture of Yeast for Distillers, of which the following is a specification:

My improved yeast is produced by the following process: To each one hundred pounds of grain use twenty gallons of water; heat to 180° in winter, and in summer to 175° Fahrenheit. Then, first, for the "starting yeast," take one hundred pounds of rye and fifty pounds of malt; heat thirty gallons of water to 175° or 180° Fahrenheit. Put first the rye and then the malt into this water, and mix until no lumps can be seen. Then cover it for one hour, after which uncover the mixture and allow it to remain from twenty-four to thirty-six hours, or until it acquires a wine-acid. Cool the same down to 70° or 75° Fahrenheit, and put to each one hundred pounds of grain one and a half gallon of fresh brewer's yeast; stir well and take the degrees of the yeast; then let it remain covered until it heats up 14° Fahrenheit.

In case fresh brewer's yeast cannot be had, take two ounces of sal-ammoniac, two ounces aloes, and four ounces of hops. Scald the hops with boiling water, and keep the same well covered for thirty minutes; strain and cool the hop-water to 100° Fahrenheit, and dissolve the ammonia and aloes and mix them well. Put the mixture in the above, and let it remain for twelve hours well covered. When the yeast has reached the required degrees, or the twelve hours have elapsed, put the yeast in copper or tin cans, and keep it cool. If kept on ice or in cool water, the yeast can be preserved for fourteen days in good condition.

Next for the working yeast: To each one hundred pounds of grain in the yeast use twenty gallons of water, and to each one hundred pounds of grain in the mash use two and a half per cent. of malt and four and a half per cent. of rye-meal. Heat the water to 175° or 180° Fahrenheit, and then put in, first, the rye, and then the malt; mix well and let it stay covered for one hour; then uncover and let it remain until it acquires a wine-acid, which generally takes from eighteen to thirty-six hours. Next cool down to 70° or 75° Fahrenheit, and add to each one hundred pounds of grain used in the yeast two gallons of cold water, and stir it well; then take the first yeast out of the tin cans and put it in the working yeast and mix well; take the degrees, and, after covering it well, let it remain on until it heats up 14° Fahrenheit. As soon as the yeast reaches the degree required, take from each one hundred pounds of yeast you make five gallons, which you will put into tin cans and keep cool.

Should the yeast not reach the required acidity in time, it may be stimulated by exposure to the atmosphere by means of a rake or paddle.

I claim as my invention—

The process for making distiller's yeast, substantially as herein shown and described.

JOSEPH WOLFF.

Witnesses:
JAKOB HUHN,
C. KIRBY.